United States Patent [19]

Hoeschele

[11] 3,856,749

[45] Dec. 24, 1974

[54] STABILIZATION OF POLYMERS CONTAINING POLY(ALKYLENE OXIDE) UNITS

[75] Inventor: Guenther Kurt Hoeschele, Wilmington, Del.

[73] Assignee: E. I. du Pont de Nemours and Company, Wilmington, Del.

[22] Filed: Apr. 17, 1973

[21] Appl. No.: 351,818

[52] U.S. Cl. .................. 260/45.9 NC, 260/45.8 N, 260/45.8 SN, 260/45.9 R, 260/45.9 QA, 260/45.9 OB, 260/45.95 R, 260/45.95 H, 260/75 R
[51] Int. Cl. ............................................. C08g 51/60
[58] Field of Search ...260/45.9 NC, 45.8 N, 45.8 SN, 260/45.95, 75 R

[56] References Cited
UNITED STATES PATENTS

| | | | |
|---|---|---|---|
| 3,157,619 | 11/1964 | Bell et al. .............................. | 260/75 |
| 3,547,879 | 12/1970 | Stewart et al. ....................... | 260/45.9 |
| 3,666,716 | 5/1972 | Wheeler .............................. | 260/45.9 |
| 3,696,170 | 10/1972 | Ishida et al. ......................... | 260/45.8 |
| 3,723,569 | 3/1973 | Hoeschele ........................... | 260/45.9 |
| 3,725,456 | 4/1973 | Scanlon et al. ..................... | 260/45.9 |

*Primary Examiner*—Donald E. Czaja
*Assistant Examiner*—Eugene C. Rzucidlo

[57] ABSTRACT

A stabilized copolyester composition consisting essentially of (a) a multiplicity of recurring long chain units and short chain ester units joined head-to-tail through ester linkages, said long chain ester units being represented by the formula

I 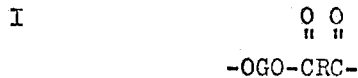

and said short chain units being represented by the formula

II 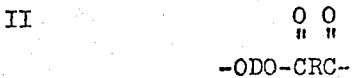

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyester, (b) an effective concentration of a compound containing

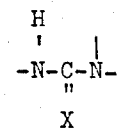

linkages or tautomeric

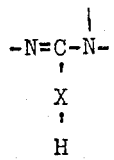

linkages where X is O, S or NH and (c) up to about 5 percent by weight of an antioxidant.

10 Claims, No Drawings

3,856,749

STABILIZATION OF POLYMERS CONTAINING POLY(ALKYLENE OXIDE) UNITS

BACKGROUND OF THE INVENTION

Linear copolyesters have been produced heretofore for various purposes, particularly for the production of films and fibers, but the known polymers of this type have not been as effective as would be desired for certain applications. In particular, certain polymers of this type did not possess superior tear strength, tensile strength, flex life and abrasion resistance which would be required for many uses such as hydraulic hose and cable coverings. Recently, a copolyetherester has been discovered which possesses such properties. Although this copolyetherester is significantly superior to those previously known in the art in many regards, it has presented a problem with regard to resistance to oxidative degradation. That is to say, with prolonged exposure to temperatures above about 120°C the copolyetherester has tended to degrade. For applications such as those in the hydraulic hose and wire insulation fields where temperatures above 120°C up to about 180°C are often encountered, an improvement in the thermostability of the copolyetherester is necessary to avoid this problem of oxidative degradation.

SUMMARY OF THE INVENTION

According to this invention there is provided an improved copolyetherester composition which has greatly enhanced resistance toward oxidative degradation of the polymer, in particular degradation at temperatures of about 120° to 200°C. This improvement is accomplished by incorporating into the polymer materials in amounts providing an effective amount, e.g. from about 0.01 to about 7.0 weight percent of the copolyetherester composition of

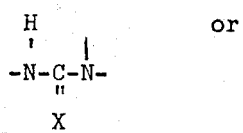

linkages where X is O, S or NH, preferably about 0.02 to 5.0 weight percent. These materials containing the aforementioned linkages are normally present as such in a physical mixture with the copolyetherester in the compositions of this invention. A suitable antioxidant such as those of the arylamine type or the hindered phenol type is required in a minor amount, e.g., about 0.2 to about five percent by weight of the copolyetherester.

The copolyetherester polymer which is to be improved by the instant invention consists essentially of a multiplicity of recurring intralinear long-chain and short-chain ester units connected head-to-tail through ester linkages, said long-chain ester units being represented by the following structure:

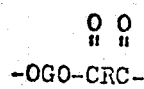

and said short-chain ester units being represented by the following structure:

$$-ODO-CRC-$$
$$\overset{O}{\underset{}{\|}}\,\overset{O}{\underset{}{\|}}$$

(b), wherein:

G is a divalent radical remaining after removal of terminal hydroxyl groups from poly(alkylene oxide) glycols having a carbon-to-oxygen ratio of about 2.0–4.3 and molecular weight between about 400 and 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the provisos that the short-chain ester units constitute about 15–95 percent by weight, preferably 25–90 percent by weight, of the copolyetherester and, ergo, the long-chain ester units constitute about 5 to 85 percent by weight, preferably 10–75 percent by weight, of the copolyetherester.

Polymers other than copolyetherester containing poly(alkylene oxide) units can also be stabilized by the presence of the urethane linkages.

DETAILED DESCRIPTION

The term "long-chain ester units" as applied to units in a polymer chain refers to the reaction product of a long-chain glycol with a dicarboxylic acid. Such "long-chain ester units," which are a repeating unit in the copolyetheresters of this invention, corespond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2-dimethyl-trimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydrdoxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as $-O-$ or $-SO_2-$.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5- naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1-C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is preferred that at least about 50 percent of the short segments are identical and that the identical segments form a homopolymer in the fiber-forming molecular weight range (molecular weight >5,000) having a melting point of at least 150°C. and preferably greater than 200°C. Polymers meeting these requirements exhibit a useful level of properties such as tensile strength and tear strength. Polymer melting points are conveniently determined by differential scanning calorimetry.

The short-chain ester units will constitute about 15–95 weight percent of the copolyetherester. The remainder of the copolyetherester will be the long chain ester units, ergo the long chain ester units will comprise about 5–85 weight percent of the copolyetherester. Copolyetheresters in which the short-chain units comprise 25–90 weight per cent with 10–75 weight per cent long-chain units are preferred.

The copolyetherester is modified by the presence of an effective amount, e.g. 0.01 to about 7.0 weight per cent of

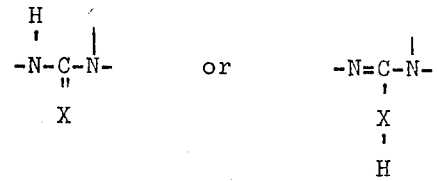

linkages, preferably 0.2 to 5.0 weight percent of such linkages and most preferably 0.5 to 3.0 weight percent. Copolyetherester compositions containing more than 7.0 weight per cent of the specified linkages will exhibit improved resistance to oxidative degradation but they are usually not as resistant as compositions containing less than about 7.0 weight per cent of such linkages. In addition compositions containing more than 7.0 weight per cent

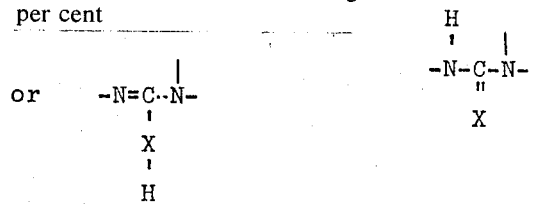

linkages have significantly different physical properties which are often inferior to the properties of the compositions of this invention.

Compounds containing

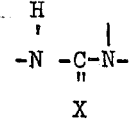

linkages, or tautomeric

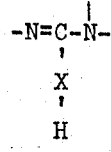

linkages, where X is O, S or NH can all be considered as being urea derivatives. The principal chemical classes having such linkages are commonly known as ureas, isoureas, thioureas, isothioureas and guanidines (imido-ureas).

Of these materials, substituted ureas or polyureas in which the

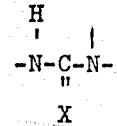

linkages may be represented by the general formula

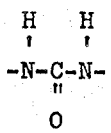

are preferred. These urea linkages occur in substantially all of the ureas or polyureas which are of use in the present invention in structures which can be represented by the general formula

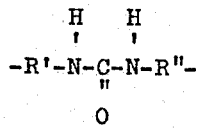

wherein R' and R'' are selected from $C_1$-$C_{40}$ aliphatic hydrocarbon radicals or $C_1$-$C_{40}$ substituted aliphatic hydrocarbon radicals, $C_6$-$C_{20}$ aromatic hydrocarbon or substituted $C_6$-$C_{20}$ aromatic hydrocarbon radicals. R' and R'' can be the same or different. Ureas in which both R' and R'' are aliphatic, including cycloaliphatic, radicals are preferred.

Preferred values for R' and R'' are $C_6$-$C_{20}$ aromatic, $C_2$-$C_{12}$ aliphatic and $C_4$-$C_{16}$ cycloaliphatic.

The required ureas are most conveniently obtained by reaction of organic isocyanates with amine group-containing compounds. In describing representative ureas which are useful in the present compositions it is convenient to describe the ureas in terms of reaction products of organic isocyanates and amino compounds; however, ureas obtained by other preparative routes, e.g., reaction of phosgene with primary amines, are not meant to be excluded. Urea itself and reaction products of isocyanates with ammonia also contain the required urea linkage

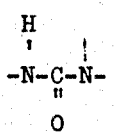

Representative non-polymeric ureas include reaction products of monoisocyanates such as ethyl isocyanate, n-hexyl isocyanate, cyclohexyl isocyanate, phenyl isocyanate and p-tolyl isocyanate with compounds containing one or more amino groups such as ethylamine, hexyl amine, isopropyl amine, aniline, toludine, naphthylamine, ethylenediamine, hexamethylenediamine, poly(oxyalkylene)diamines, 4,4',4''-triaminotriphenylmethane, m-phenylenediamine, p-phenylenediamine and methylenedianiline and bisphenol A. Also included are reaction products of amines having one amino group, such as those listed in the preceding sentence, with polyisocyanates such as tolylene 2,4-(-2,6-)diisocyanate, 1,3-(1,4-)phenylene diisocyanate, 2,6-naphthalene diisocyanate, 4,4'-methylenebis(phenyl isocyanate), polymethylene polyphenylisocyanate, 4,4',4''-triisocyanatotriphenylmethane, 1,6-hexane diisocyanate, 1,4-cyclohexane diisocyanate, 4,4'-methylenebis(cyclohexyl isocyanate), 2,4-bis(4-isocyanatocyclohexylmethyl)cyclohexylisocyanate and 1,4-xylene diisocyanate. Non-polymeric ureas can also be prepared by reacting a large excess of polyisocyanate with a polyamine or conversely a large excess of polyamine with a polyisocyanate. The resulting products would have reactive isocyanate or amino groups respectively. Ureas containing aliphatic amino groups are not preferred because aliphatic amino groups degrade the copolyetherester by cleaving ester linkages. Illustrative of such products would be the reaction product of 2 moles of hexamethylenediamine with methylenebis(phenyl isocyanate) or 2 moles of tolylene-2,4-diisocyanate with methylenedianiline.

Polymeric ureas useful in the present compositions can be prepared by the reaction of polyisocyanates and polyamines in about equivalent amounts, the degree of polymerization increasing as the ratio of $NCO/NH_2$ approaches a value of one. Generally linear polyureas are preferred and these are prepared by reacting diisocyanates and diamines such as those listed in the previous paragraph. Minor amounts of polyisocyanates or polyamines having a functionality greater than 2 can be used in the preparation of polymeric ureas, but their presence results in cross-linked products which are incorporated into copolyetherester with increased difficulty. Such cross-linked ureas are however, effective in the stabilization of the copolyetherester.

Preferred ureas are linear polyureas which on hydrolysis yield aliphatic, including cycloaliphatic, primary amino groups. These fully aliphatic linear polyureas have greater thermal stability and in general lower melting points than do their aromatic counterparts. These properties are of value in preparing the compositions of the present invention. In addition, the fully aliphatic linear polymers are more effective as stabilizers for the copolyetheresters.

Thiourea derivatives or polythioureas corresponding to the ureas just described are also useful in the present compositions. These materials can be obtained by means analogous to those described for the ureas by employing isothiocyanates in place of isocyanates. Similarly guanidines or polyguanidines in which the urea carbonyl oxygen has been replaced by an imido group (=NH) are useful in the present compositions. These required guanidines can be obtained by dehydrating ureas to form carbodiimides to which ammonia adds with the formation of a guanidine. Other guanidines such as cyanoguanidine which are obtained by other preparative methods can also be used.

A variety of heterocyclic compounds containing the urea linkage

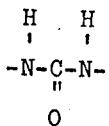

or its tautomeric form

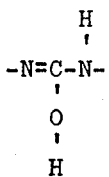

are useful in preparing the compositions of the present invention. These include imidazolones such as ethylene urea and benzimidazolone, hydantoin, dihydro-uracil, uracil, barbituric acid, uric acid, allantoin, xanthine, cyanuric acid and substituted derivatives thereof. Corresponding thio derivatives of these heterocycles are also useful in the present invention such as the mercaptoimidazolones. Likewise, derivatives of the above heterocycles in which the carbonyl oxygen of the urea linkage is replaced by an imido group (=NH) such as melamine, benzoguanamine, guanine and ammeline and substitution product thereof are also useful.

Other compounds containing the linkage

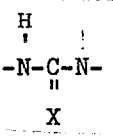

or its tautomeric form which are useful in the present compositions include biurets, polybiurets, and trisubstituted ureas such as trialkylureas.

Hereinafter, the term "urea" is meant to include all of the above classes of compounds containing

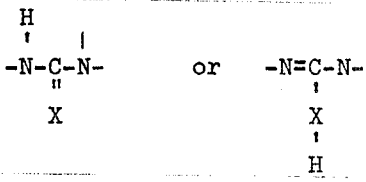

linkages.

As previously indicated, the presence of a suitable anioxidant in amounts up to about 5 percent by weight of the copolyetherester, e.g. 0.2 to 5.0 percent by weight in addition to the urea is required. Preferably, the antioxidant is employed in amounts of about 0.5 to 3.0 percent by weight of the copolyetherester. Specific classes of preferred antioxidants are the arylamines and the hindered phenols.

Representative arylamine antioxidants include:

Diarylamines such as phenyl naphthylamines, octylated diphenylamine, 4,4'-dimethoxydiphenylamines, 4,4'-bis(α,α-dimethylbenzyl)diphenylamine and 4-isopropoxydiphenylamine;

p-Phenylenediamine derivatives such as N,N'-bis-1-methylheptyl-p-phenylenediamine, N,N'-di-beta-naphthyl-p-phenylenediamine, N,N'-diphenyl-p-phenylenediamine, N-cyclohexyl-N'-phenyl-p-phenylenediamine, and N-sec-butyl-N'-phenyl-p-phenylenediamine; and Ketone aldehyde amine condensates such as polymerized 1,2-dihydro-2,2,4-trimethylquinoline, 6-ethoxy-1,2-dihydro-2,2,4-trimethylquinoline, diphenylamine-acetone condensation products, N-phenyl-β-naphthylamine-acetone condensation products, butyraldehyde-aniline condensation products and aldol-α-naphthylamine.

Of the arylamine antioxidants 4,4'-bis(α,α-dimethylbenzyl)diphenylamine is especially prefered.

Hindered phenol antioxidants are generally characterized by the presence of one or more radicals having the formula

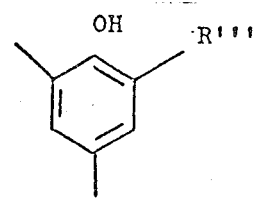

wherein R''' is a secondary or more preferably a tertiary alkyl group. Representative hindered phenol antioxidants include:

Monohydric phenols such as 2,6-di-tert-butyl-4-methylphenol, butylated p-phenyl-phenol and 2-(α-methylcyclo-hexyl)-4,6-dimethylphenol;

Bis-phenols such as 2,2'-methylenebis-(6-tert-butyl-4-methylphenol), 4,4'-bis(2,6-di-tert-butylphenol), 4,4'-methylenebis(6-tert-butyl-2-methylphenol), 4,4'-butylene-bis(6-tert-butyl-3-methylphenol), 4,4'-methylenebis(2,6-di-tert-butylphenol), 4,4'-thiobis(6-tert-butyl-2-methylphenol), and 2,2'-thiobis(4-methyl-6-tert-butylphenol);

Tri-phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite.

Of the hindered phenol antioxidants, 1,3,5-tris-(3,5-di-tert-butyl-4-hydroxyhydrocinnamoyl)hexahydro-s-triazine is especially preferred.

The copolyesters described herein can be made conveniently by a conventional ester interchange reaction. Other polymerization techniques as described in U.S. Pat. No. 3,023,192 to Shivers are useful for specific polymers. A preferred procedure involves heating the dicarboxylic acid, e.g., dimethyl ester of terephthalic acid with a long chain glycol, e.g., poly(tetramethylene oxide) glycol having a molecular weight of about 600–2,000 and a molar excess of diol e.g. 1,4-butanediol in the presence of a catalyst at about 150°–260°C. and a pressure of 0.5 to 5 atmospheres, preferably ambient pressure, while distilling off methanol formed by the ester interchange. Depending on temperature, catalyst, glycol excess, and equipment, this reaction can be completed within a few minutes e.g., 2 minutes to a few hours, e.g., 2 hours.

Concerning the molar ratio of reactants, at least about 1.1 mole of diol should be present for each mole of acid, preferably at least about 1.25 mole of diol for each mol of acid. The long chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. obviously, the prepolymer might also be prepared by running these processes in the presence of the long chain glycol.

The resulting prepolymer is then carried to high molecular weight by distllation of the excess of short chain diol. This process is known as "polycondensation."

Additional ester interchange occurs during this polycondensation which serves to increase the molecular weight and to randomize the arrangement of the copolyetherester units. Best results are usually obtained when this final distillation or polycondensation is run at less than about 5mm. pressure and about 200°–270°C for less than about two hours e.g. 0.5 to 1.5 hours.

Most practical polymerization techniques rely upon ester interchange to complete the polymerization reaction. In order to avoid excessive hold time at high temeratures with possible irreversible thermal degradation, a catalyst for the ester interchange reaction should be employed. While a wide variety of catalysts can be employed, organic titanates such as tetrabutyl titanate used along or in combination with magnesium or calcium acetates are preferred. Complex titanates, such as $Mg[MTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2 percent by weight based on total reactants.

Ester interchange polymerizations are generally run in the melt without added solvent, but inert solvents can be used to facilitate removeal of volatile components from the mass at low temperatures. This technique is especially valuable during prepolymer preparation, for example, by direct esterification. However, certain low molecular weight diols, for example, butane diol in terphenyl, are conveniently removed during high polymerization by azeotropic distillation. Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The dicarboxylic acids or their derivatives and the polymeric glycol are incorporated into the final product in the same molar proportions as are present in the ester interchange reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of diol incorporated is still the difference between moles of diacid and polymeric glycol.

Most preferred copolyesters which are stabilized by the process of this invention are those prepared from dimethyl terephthalate, 1,4-butanediol, and poly(tetramethylene oxide) glycol having a molecular weight of about 600–2000 or poly-(ethylene oxide) glycol having a molecular weight of about 600–1500. Optionally, up to about 30 mole percent and preferably 5–20 mole percent of the dimethyl terephthalate in these polymers can be replaced by dimethyl phthalate or dimethyl isophthalate. Other preferred copolyesters are those prepared from dimethyl terephthalate, 1,4-butanediol, and poly(propylene oxide) glycol having a molecular weight of about 600–1600. Up to 30 mole percent and preferably 10–25 mole percent of the dimethyl terephthalate can be replaced with dimethyl isophthalate or butanediol can be replaced with neopentyl glycol until up to about 30 percent and preferably 10–25 percent of the short chain ester units are derived from neopentyl glycol in these poly(propylene oxide) glycol polymers. The polymers based on poly(tetramethylene oxide) glycol are especially preferred because they are easily prepared, have overall superior physical properties, and are especially resistant to water.

The most preferred copolyetherester compositions also contain (A) 0.5 to 3 weight percent of an antioxidant, preferably 4,4'-bis($\alpha,\alpha$-dimethylbenzyl)diphenylamine or 1,3,5-tris(3,5-di-tert-butyl-4-hydroxyhydrocinnamoyl)hexahydro-s-triazine and (B) 0.5 to 3.0 weight percent of urea linkages, preferably provided by a linear polyurea which on hydrolysis yields aliphatic, including cyloaliphatic, primary amino groups.

The antioxidant may be added at any time during the preparation of the copolyetherester or following its preparation. Preferably an antioxidant should be present during the polycondensation aspect of the reaction in an amount of at least about 0.2 percent by weight based on the estimated yield of copolyetherester product, preferably in an amount of 0.5 to 3.0 percent by weight. It is preferred that a suitable antioxidant be present at any point in the process where the poly(alkylene oxide) glycol is exposed to elevated temperatures, e.g., above about 100°C. The antioxidant, depending on its melting point, may be added as a solid, a molten liquid, or as a solution or dispersion in one or more of the reactants. In batch operation, it is conveniently added as a solid or as a solution or dispersion in the diol or the poly(alkylene oxide) glycol at the time of charging the reactor. In continuous operation, the antioxidant is most conveniently added as a solution or dispersion in the diol and/or glycol entering the process. The antioxidant may, of course, be introduced at later stages in the process and even after preparation of the copolyetherester is complete. It is usually convenient to add the total amount of antioxidant desired in the finished copolyetherester during its preparation; however, additional amounts of antioxidant can be added to the finished copolyetherester by melt blending.

During the preparation of the copolyetherester the antioxidant prevents oxidative degradation (resulting from air inleakage) of the reactants and the polymer as it is being formed. The preferred antioxidants do not interfere with transesterification or interact with transesterification catalysts. Because oxidative degradation is substantially eliminated during the polymerization, a more uniform product of higher quality, as indicated by improved inherent viscosity, is obtained. The color of the product is also superior.

The urea can be added to the finished copolyetherester at the time the molten copolymer is removed from the final stage of melt condensation or later in a separate step in which the copolyetherester is remelted. Addition of the urea directly to the molten polymer leaving the condensation generally provides the ultimate in uniformity of distribution throughout the copolyetherester and avoids any thermal degradation of the copolyetherester which might be encountered on remelting. An additional advantage is the avoidance of an uneconomical separate blending step. In the case of ureas with reactive end groups, the urea may be partially incorporated into the backbone of the copolyetherester. When it is desired to finish polymerization of the copolyetherester by solid phase polymerization, the urea preferably is introduced into the copolymer prior to the solid phase condensation. In general, temperatures below 200°C, and preferably not above 200°C, should be used for solid phase polymerization in the presence of the urea.

As previously indicated, the urea can be added to the fully finished copolyesthererester by remelting. The urea can also be added in part immediately following preparation with the remainder added later in a separate melt blending step.

In the case where the urea is to be added to the fully finished copolyetherester the following procedures are illustrative. For best results, the two components must be thoroughly and uniformly blended, otherwise localized areas will differ in properties. The compositions may be prepared by adding the urea to copolyetherester which has been heated to a temperature sufficient to soften or melt the copolyetherester and agitating until the urea is incorporated. The temperature required to soften or melt the copolyetherester depends on the particular copolyetherester, but generally will be in the range of 150-280°C. Generally, it is preferred to use the lowest temperature which will permit the means of agitation to be effective; however, with high melting ureas, higher temperatures may be required. For example, if agitation is limited to that provided by a close-fitting paddle stirrer in a kettle, the copolyetherester will have to be heated somewhat above its melting point to lower its viscosity. If more powerful agitation is available, such as that provided by heated rubber mills, internal mixers (Banbury mixer) or single or twin screw extruders, temperatures near the softening point or melting point of the copolyetherester can be used. If desired, solvents or plasticizers can be used to assist in mixing the urea with the copolyetherester at lower temperatures. A particularly convenient procedure for preparing the compositions consists of dry blending the urea with the copolyetherester in granular or pellet form and incorporating the urea into the copolyetherester in an extruder. Ureas having end-groups such as carboxyl groups, hydroxyl groups, isocyanate groups and ester groups are reactive to at least some extent at elevated temperatures with the copolyetheresters. During addition of the urea to the copolyetherester, partial incorporation of the urea into the copolyetherester backbone may take place. The urea is effective in preventing oxidative degradation if present either as a physical mixture in the copolyetherester or as part of the copolyetherester backbone. When ureas having inert end-groups are used, reaction with the copolyetherester is negligible.

The resulting product has improved resistance to oxidative degradation at temperatures in excess of 120°C. Illustrative uses of the compositions include hydraulic hose tubes and covers, wire and cable insulation and gaskets requiring high service temperatures. Use of the compositions in the presence of solvents such as hydraulic fluids does not interfere with the ability of the compositions to resist degradation.

Properties of these heat stabilized copolyetherester compositions can also be modified by incorporation of various conventional organic fillers, such as carbon black, silica gel, alumina, clays and chopped fiber glass. White or light colored fillers are preferred with the non-discoloring compositions of this invention. In general, these additives have the effect of increasing the modulus of the material at various elongations. Compounds having a range of hardness values can be obtained by blending hard and soft copolyetheresters of this invention.

All parts, proportions and percentages disclosed herein are by weight unless otherwise indicated.

The following examples further illustrate the invention:

The following ASTM methods are employed in determining the properties of the polymers prepared in the examples which follow:

| | |
|---|---|
| Modulus at 100% elongation*, $M_{100}$ | D412 |
| Modulus at 300% elongation*, $M_{300}$ | D412 |
| Modulus at 500% elongation*, $M_{500}$ | D412 |
| Tensile at Break*, $T_B$ | D412 |
| Elongation at Break*, $E_B$ | D412 |
| Hardness, Shore D | D1484 |
| Heat Aging** | D865 |

\* Cross-head speed 2"/minute if not stated otherwise
\*\* All heat aging experiments were carried out with dumbbell shaped test specimens as described in ASTM D412. If not stated otherwise, the thickness of the test specimens was 45-48 mil.

The useful polymer life at the specified aging temperatures is determined by the 180° bend test. In this test the dumbbell shaped test specimen as described in ASTM method D412, is removed from the heat aging tubes and kept at room temperature for about 10 minutes. Then the dumbbell is bent in both directions until the ends touch each other. If the test specimen breaks during this procedure, it failed in the 180° bend test.

Inherent viscosities of the polymers in the following examples are measured at 30°C at a concentration of 0.1g./dl. in m-cresol.

The following catalyst is used in preparing the copolyesters of the examples:

Catalyst

To 425 parts of anhydrous 1,4-butanediol in a round bottom flask is added 23.32 parts of tetrabutyl titanate. The mixture is agitated at 50°C for 2-3 hours until the small amount of solids originally present disappear.

Copolyester A is prepared by placing the following materials in an agitated flask fitted for distillation:

| | |
|---|---|
| Polytetramethyleneether glycol; number average molecular weight about 975 | 10.75 parts |
| 1,4-Butanediol | 28.0 parts |
| Dimethyl terephthalate | 36.45 parts |
| Dimethyl phthalate | 3.65 parts |
| 4,4'-bis (alpha,alpha-dimethylbenzyl) diphenylamine | 0.57 parts |
| Catalyst | 1.1 parts |

A stainless steel stirrer with a paddle cut to conform with the internal radius of the flask is positioned about one-eighth inch from the bottom of the flask and agitation is started. The flask is placed in an oil bath at 160°C, agitated for five minutes and then the catalyst is added. Methanol distills from the reaction mixture as the temperature is slowly raised to 250°C over a period of 1 hour. When the temperature reaches 250°C, the pressure is gradually reduced to 0.3 mmHg within 20 minutes. The polymerization mass is agitated at 250°C/0.3 mmHg for 35 minutes. The resulting viscous molten product is scraped from the flask in a nitrogen (water and oxygen free) atmosphere and allowed to cool. The inherent viscosity of the product at a concentration of 0.1g./dcl. in m-cresol at 30°C is 1.35. Samples for heat aging and physical testing are prepared by compression molding at about 240°C for one minute and cooling rapidly in the press. The polymer has a Shore D hardenss of about 63.

Copolyester B containing a lower proportion of short chain ester units is prepared by substantially the same procedure from the following materials:

| | | |
|---|---|---|
| Polytetramethyleneether glycol; number average molecular weight about 975 | 38.5 | parts |
| 1,4-Butanediol | 36.5 | parts |
| Dimethyl terephthalate | 60.0 | parts |
| 4,4'-bis (alpha,alpha-dimethylbenzyl) diphenylamine | 1.05 | parts |
| Catalyst | 2.1 | parts |

The polymer has an inherent viscosity of 1.40 and a Shore D hardness of 55.

Copolyester C is prepared according to the following procedure:

In an agitated reactor fitted with a distillation column, 384g. of ethylene glycol, 572 g. of dimethyl terephthalater 2.6 g. sym-di-beta-naphthyl-phenylene diamine and 18 ml. of Catalyst are agitated and heated. Reflux rate was adjusted so that the temperature at the head of the distillation column was maintained at 70°C. while methanol was removed. When substantially all of the methanol had been removed, the head temperature rises abruptly to about 180°C. Heating and distillation of ethylene glycol were continued until the temperature in the reactor reached 230°C. The reaction mixture was allowed to cool to 185°C and 342 g of poly(-tetramethylene oxide) glycol having a number average molecular weight of about 1,000 was added. The flask was immersed in a 250°C oil bath and the mixture was agitated for five minutes under nitrogen. While maintaining the oil bath at 250°C, full vacuum was carefully applied to the system. After stirring for 60 minutes at a reduced pressure of 0.22 mm Hg the polymer was removed from the flask under nitrogen. The polymer had an inherent viscosity of about 1.33dl/g and a Shore D hardness of 55D.

PolyureaA is prepared by adding slowly 8.5 g 1,6-hexanediisocyanate (0.0506 mole) to a solution of 10.0 g 1,12-diaminododecane (0.05 mole) in 100 ml dimethyl formamide vigorously agitated at 60°C. The resulting slurry is poured into 1,000 ml ice water and filtered. The solids are washed several times with methanol and then dried in a vacuum desiccator. The polymer has a urea content of about 31.5 percent

EXAMPLE 1

A. 5.0 parts of Polyurea A were mixed under nitrogen with 100 parts of dry Copolyester A by melting the polymer mixture in the reactor described above at 240°C and agitating the viscous polymer melt for 10-15 minutes.

B. For control purposes Copolyester A without urea modification was used.

Dumbbell shaped test specimens of both polymer compositions died out from 46 mill compression molded slabs were aged at 177°C, the physical properties before and after aging are shown in Table I.

TABLE I

| Original Properties | 1-A | Control 1-B |
|---|---|---|
| Urea content, % | 1.5 | none |
| $M_{100}$, psi | 2500 | 2400 |
| $M_{300}$, psi | 3550 | 3350 |
| $T_B$, psi | 6200 | 6750 |
| $E_B$, % | 510 | 530 |
| Hardness, Shore D | 64 | 64 |
| Properties After Heat Aging at 177°C for 3 Days | | |
| $T_B$, psi | 3200 | 1500 |
| $E_B$, % | 60 | <10 |
| 180° bend test | passed | failed |
| Polymer Life* at 177°C, Days | 10 | ~3 |

\* Based on 180° bend test.
\*\* Cross-head speed 20''/min.

EXAMPLE 2

330 parts of dry Copolyester B and 16.5 parts of day Polyurea A were dry-blended and mixed in a single screw extruder at 222°C.

46 mil dumbbells of the polymer composition of this example were aged at 163°C together with a control polymer consisting of polyurea-free Copolyester B. The results are shown below:

TABLE II

| Original Properties** | Polyurea Stabilized Polymer | Control (Without Polyurea) |
|---|---|---|
| Inherent viscosity, dl/g | 1.31 | 1.40 |
| $M_{100}$, psi | 2170 | 2075 |
| $M_{300}$, psi | 2460 | 2360 |
| $M_{500}$, psi | 5610 | 3610 |
| $T_B$, psi | 5400 | 5960 |
| $E_B$, % | 700 | 720 |
| Shore D Hardness | 55 | 54 |
| Properties* After Heat Aging at 163°C for 7 Days | | |
| $T_B$, psi | 2650 | 1850 |
| $E_B$, % | 100 | 10 |
| Polymer Life** at 163°C, Days | 18 | 8 |

\* Cross-head speed 20''/min.
\*\* Based on 180° bend test

When the procedure of Example 2 is repeated with Copolyester C instead of Copolyester B substantially the same improvement is obtained.

EXAMPLE 3

The following stabilized polymer compositions were prepared from Copolyester A by either the reactor mixing procedure given in Example 1 or by extruder mixing as described in Example 2.

| Stabilizer | | Stabilizer level, phr. | Approximate NH—C—NH ‖ X content, percent | Mixing method |
|---|---|---|---|---|
| A | Bis[4-(3-phenyl-ureido) cyclohexyl]methane. | 2.0 | 0.25 | Reactor. |
| B | Cyanoguanidine | 0.25 | 0.17 | Do. |
| C | Benzoguanamine | 0.9 | 0.47 | Do. |
| D | Melamine | 0.5 | *0.5 | Do. |
| E | N,N'-diheptylthiourea | 1.0 | 0.27 | Extruder. |
| F | N-(1-naphthyl)thiourea | 1.0 | 0.36 | Do. |

*100% basis.

As control polymer Copolyester A without modification was used (G).

The useful life of these polymers at 177°C as determined by the 180° bend test is shown in Table III.

TABLE III

| Polymer Composition | Initial Inherent Viscosity (dl/g) | Polymer Life at 177°C days |
|---|---|---|
| A | 1.20 | 7 |
| B | 1.13 | 8 |
| C | 1.16 | 12 |
| D | 1.14 | 12 |
| E | 1.21 | 5 |
| F | 1.11 | 6 |
| G (Control) | 1.35 | 3 |

EXAMPLE 4

A. The preparation of Copolyester B was essentially repeated except that 1.05 parts of 1,3,5-tris(3,5-ditert.-butyl-4-hydroxy hydrocinnamoyl) hexahydro-s-triazine (1.0 wt. percent was used as stabilizer instead of 4,4'-bis(alpha, alphadimethylbenzyl) diphenylamine. The resulting composition had an inherent viscosity of 1.56 dl/g and was used as a control polymer.

B. 100 parts of Copolyester 4A are mixed with 5 parts of Polyurea A at 220°C as described in Example 1 yielding a polymer blend having a urea content of about 1.5 percent.

Both polymer compositions are heat aged at 150°C for seven days and tested at 24°C. After this aging period Polymer 43 exhibits about 45 percent of its original tensile strength and 40 percent of the elongation at break. On the other hand, the prior art polymer 4A retained only 23 percent of its tensile strength and 1.5 percent of the original elongation at break after heat aging for the same length of time.

Substantially the same results are obtained when Example 4 is repeated with the corresponding poly(ethylene oxide) glycol or poly(propylene oxide)glycol based copolyesters instead of Copolyester B.

I claim:

1. A copolyetherester composition stabilized against oxidative degradation which consists essentially of a mixture of (a) a copolyetherester containing a multiplicity of recurring long chain ester units and short chain ester units joined head-to-tail through ester linkages, said long chain ester units being represented by the formula $$\text{I} \quad -\text{OGO}-\overset{\text{O}}{\underset{\|}{\text{C}}}\text{R}\overset{\text{O}}{\underset{\|}{\text{C}}}-$$

and said short chain units being represented by the formula $$\text{II} \quad -\text{ODO}-\overset{\text{O}}{\underset{\|}{\text{C}}}\text{R}\overset{\text{O}}{\underset{\|}{\text{C}}}-$$

where G is a divalent radical remaining after the removal of terminal hydroxyl groups from a poly(alkylene oxide) glycol having a molecular weight of about 400–600 and a carbon to oxygen ratio of about 2.0–4.3; R is a divalent radical remaining after removal of carboxyl groups from a dicarboxylic acid or ester-forming equivalent thereof having a molecular weight less than about 300 and D is a divalent radical remaining after removal of hydroxyl groups from a diol having a molecular weight less than about 250; provided said short chain ester units amount to about 15–95 percent by weight of said copolyester, (b) 0.01 to 7 percent by weight of the composition of an additive having the general formula:

$$-\text{R}'-\overset{\text{H}}{\underset{}{\text{N}}}-\overset{}{\underset{\|}{\text{C}}}-\overset{\text{H}}{\underset{}{\text{N}}}-\text{R}''-$$
$$\text{O}$$

wherein R' and R'' are independently selected from the group consisting of $C_1$–$C_{40}$ aliphatic or substituted aliphatic radicals and $C_6$–$C_{20}$ aromatic or substituted aromatic radicals, and (c) 0.2 to about 5 percent by weight of an antioxidant.

2. The composition of claim 1 in which R' and R'' are independently selected from the group consisting of $C_2$–$C_{12}$ aliphatic and $C_4$–$C_{16}$ cycloaliphatic radicals.

3. The composition of claim 1 wherein the urea is formed by reacting a diisocyanate with a diamine.

4. The composition of claim 3 wherein the diisocyanate is 1,6-hexanediisocyanate and the diamine is 1,12-diamino-dodecane.

5. The composition of claim 1 wherein said antioxidant is an arylamine or a hindered phenol.

6. The composition of claim 1 wherein said antioxidant is 4,4'-bis($\alpha$,$\alpha$-dimethylbenzyl) diphenylamine.

7. The composition of claim 1 wherein said antioxidant is 4,4'-bis($\alpha$,$\alpha$-dimethylbenzyl) diphenylamine.

8. The composition of claim 1 wherein said antioxidant is present in the amount of 0.2 to 5 weight percent.

9. The composition of claim 7 wherein said poly(alkylene oxide) glycol is poly(tetramethylene oxide) glycol having a molecular weight of 600–2000, the diol is 1,4-butanediol and R is derived from a mixture of dimethyl terephthalate and dimethyl phthalate.

10. The composition of claim 7 wherein said dicarboxylic acid is dimethyl terephthalate.

* * * * *